: 3,658,743
Patented Apr. 25, 1972

3,658,743
STABILIZATION OF UNSATURATED HYDROCARBON ELASTOMERS BY SYNERGISTIC COMBINATION OF A PHENOLIC COMPOUND AN ORGANIC SULFIDE OR THIOESTER AND AN EPOXIDE OR PHOSPHITE ESTER
Edward M. Bevilacqua, deceased, late of Allendale, N.J., by Alfred E. Sidwell, administrator, Upper Saddle River, N.J., assignor to Uniroyal, Inc., New York, N.Y.
No Drawing. Filed Apr. 30, 1970, Ser. No. 33,480
Int. Cl. C08d 11/04
U.S. Cl. 260—23.5 A
36 Claims

ABSTRACT OF THE DISCLOSURE

Hydrocarbon elastomers of low unsaturation (e.g., EPDM, butyl rubber) or high unsaturation (e.g., SBR) are stabilized against oxidation by the use of a ternary synergistic combination of:

(a) a phenol;
(b) an organic sulfide or thioester; and
(c) an epoxide or phosphite ester.

An example is ethylene-propylene-dicyclopentadiene terpolymer rubber stabilized with (a) 4,4'-isopropylidene bisphenol, (b) dilauryl thiodipropionate, and (c) epoxidized soybean oil.

CROSS REFERENCE TO COPENDING APPLICATION

Commonly assigned copending application Ser. No. 33,479 of Charles W. Lee filed of even date herewith, deals with binary synergistic stabilizing combinations for EPDM elastomers, based on (a) an epoxide and (b) an organic sulfide.

BACKGROUND OF THE INVENTION

(1) Field of the invention

This invention relates to a composition comprising an unsaturated hydrocarbon elastomer containing a synergistic antioxidant combination.

(2) Description of the prior art

British Pat. 945,441, Argus Chemical Corp., Dec. 23, 1963, discloses stabilization of polypropylene with an organic phenol, certain organic phosphite triesters, and a thiodipropionic acid ester. The present invention is directed to the problem of protecting unsaturated hydrocarbon elastomers against oxidation, which is a distinctly different problem from the stabilization of polypropylene.
British Pat. 917,100, Du Pont, Jan. 30, 1963, discloses the stabilization of polyolefins with two-components synergistic combinations of certain epoxide resins plus an antioxidant which may be a phenolic antioxidant or thiodipropionate antioxidant. The present invention differs from this in that the present synergistic combination has three components (phenol, sulfide or thioester and epoxide or phosphite), and the present invention deals not with saturated thermoplastic polyolefin resins but with unsaturated vulcanizable rubbers.

DETAILS OF THE INVENTION

The invention is based on the discovery that a synergistic antioxidant effect, in unsaturated sulfur-vulcanizable hydrocarbon eleastomers, is obtained by combined use of:

(a) a phenol;
(b) an organic sulfide or thioester; and
(c) an epoxide or phosphite ester.

This synergistic combination of materials enhances the resistance to thermal oxidation of both low and high unsaturation hydrocarbon eleastomers, and is particularly useful for imparting storage stability. Most surprising is the enhanced antioxidant effect obtained from phenolic materials which are not in themselves effective antioxidants, particularly the unhindered materials such as phenol, p-chlorophenol and the like. Also surprising is the enhanced antioxidant effect obtained with phenols which are in themselves good antioxidants, particularly the unhindered bisphenols (e.g., 4,4'-isopropylidene bisphenol), at unusually low levels of concentration, i.e., at 0.025 to 0.08 part per 100 parts by weight of rubber, in the present ternary combination. This low concentration range is much lower than the amount necessary when the phenol is used by itself. This is most desirable, because many phenols by themselves, at customary concentrations, not only cause appreciable discoloration when the unvulcanized elastomer is subjected to elevated temperatures during manufacture, but do not give the level of antioxidant activity that is obtainable with any one of the ternary synergistic antioxidant combinations of this invention.

The sulfur-vulcanizable unsaturated hydrocarbon elastomers employed in the invention include highly unsaturated polymers, notably the homopolymers of conjugated diolefins (e.g., butadiene, isoprene, etc.) and the copolymers of at least 50% of such diolefins with correspondingly not more than 50% by weight of at least one copolymerizable monoethylenically unsaturated monomer (such as styrene, acrylonitrile, ethyl acrylate, methyl methacrylate, vinyl pyridine, etc.). Thus, polybutadiene may be employed in the invention (whether emulsion-prepared or solution-prepared; whether stereo-specific or otherwise, of either high cis-content or low cis-content, or trans-polybutadiene), or polyisoprene (natural or synthetic). Solution-prepared or emulsion-prepared SBR may be employed in the invention.

The invention extends especially to polymers of low unsaturation such as the copolymers containing relatively small amounts of conjugated or non-conjugated dienes. Among these may be mentioned the butyl rubber types, notably copolymers of such isoolefins as isobutylene with from 0.5 to 10% of such conjugated diolefins as isoprene or butadiene.

Important low unsaturation polymers are the copolymers of at least two different alpha-monoolefins with at least one copolymerizable polyene (see U.S. Pat. 3,361,-691, Mazzeo, Jan. 2, 1968, especially col. 1, line 37 to col. 2, line 3; also U.S. Pat. 3,102,104, Brice, Aug. 27, 1963 and the references cited therein). Usually one of the alpha-monoolefins is ethylene and the other is ordinarily propylene, although other pairs of alpha-monoolefins may be used. Usually the copolymerizable polyene is a non-conjugated diene, whether open chain as in 1,4-hexadiene or cyclic (especially bridged ring) as in dicyclopentadiene, ethylidene norbornene, methylene norbornene, cyclooctadiene, tetrahydroindene, etc. These rubbers are known as "EPDM" (see U.S. Pat. 3,419,639, Gentile, Dec. 31, 1968 and the references cited therein), and frequently contain from about 1 to about 20% by weight of the non-conjugated diene. Ethylene-propylene-dicyclopentadiene terpolymer and ethylene-propylene-ethylidene norbornene terpolymer are especially preferred.

More than one unsaturated elastomer may be employed in the composition of the invention if desired, e.g., an SBR-cis-BR blend, a butyl-EPDM blend, a blend of SBR or BR or IR with ethylene-propylene-ethylidene norbornene terpolymer, etc.

The phenolic materials (a) employed in this invention include those in which one or more hydroxyl groups are attached to one benzene nucleus and also those materials containing two or more benzene nuclei each of which contains an hydroxyl group. These phenols include those defined by the formulas:

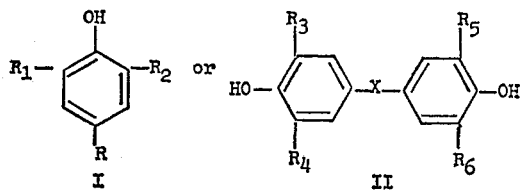

In the mononuclear phenols as represented by Formula I, R, $R_1$, and $R_2$ can be the same or different or any combination of the following groups, for example: hydrogen, alkyl (straight chain or branched), aralkyl (straight chain or branched), alkenyl, aryl or alkaryl and each of the aforesaid hydrocarbon groups usually contain not more than 10 carbon atoms. Included in these mononuclear phenols is the class where only one of the groups (R, $R_1$ and $R_2$) is a halogen such as fluorine, chlorine, bromine or nitro ($NO_2$) or hydroxyl (OH) group. Also included in these mononuclear phenols is that class where R is an alkyl radical which is in turn substituted with a symmetrically disubstituted dicarbamoyl radical.

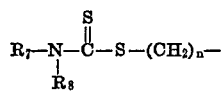

wherein $R_7$ and $R_8$ are the same and can be for example an alkyl (straight chain or branched), aryl or alkaryl, each of the aforesaid groups frequently containing not more than 10 carbon atoms. The $n$ can vary for example from 1 to 5.

In the case of polynuclear phenols as represented by Formula II, $R_3$, $R_4$, $R_5$ and $R_6$ can be the same or different and are ordinarily hydrogen or alkyl (straight chain or branched) groups typically containing not more than 10 carbon atoms and —X— is a single diradical typified by —O—, —S—, —$CH_2$—, —$CH_2$—$CH_2$—,

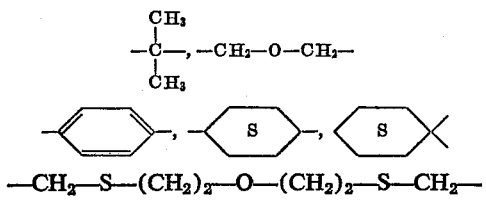

—$CH_2$—S—($CH_2$)$_2$—O—($CH_2$)$_2$—S—$CH_2$— and

The various X and R groups are exemplified in the following compounds:
Exemplary of mononuclear phenols are phenol,
2-methylphenol,
2-ethylphenol,
2-propylphenol,
2-tertiarybutylphenol,
2-tertiaryoctylphenol,
2-nonylphenol,
4-methylphenol,
4-ethylphenol,
4-propylphenol,
4-tertiarybutylphenol,
4-tertiaryoctylphenol,
2-methyl-6-ethylphenol,
2-ethyl-6-tertiarybutylphenol,
2,6-ditertiarybutylphenol,
2-methyl-6-tertiaryoctylphenol,
2-butyl-6-tertiaryoctylphenol,
2,6-dinonylphenol,
2,4,6-triethylphenol,
2-ethyl-4,6-ditertiarybutylphenol,
2,6-diethyl-4-tertiaryoctylphenol,
2,6-dibutyl-4-isopropyl-phenol,
2,4,6-trimethylphenol,
2-benzylphenol,
2-(α-methyl benzyl)phenol,
2-(α-ethylbenzyl)phenol,
4-benzylphenol,
4-(α-ethylbenzyl)phenol,
2,4-dibenzylphenol,
2,6-dibenzylphenol,
2,6-dibenzyl-4-methylphenol,
2,6-dibenzyl-4-tertiarybutylphenol,
2,6-dibenzyl-4-nonylphenol,
2-(α-methylbenzyl)phenol,
4-(α-methylbenzyl)phenol,
2,4-di(α-methylbenzyl)phenol,
2-(α-methylbenzyl)-4-propylphenol,
2-(α-methylbenzyl)-4-tertiarybutylphenol,
2-(α-methylbenzyl)-4-methylphenol,
2,4,6-tri(α-methylbenzyl)phenol,
2,6-di(α-methylbenzyl)-4-methylphenol,
2,6-di(α-methylbenzyl)-4-tertiarybutylphenol,
2,6-di(α-methylbenzyl)-4-propylphenol,
2,6-di(α-methylbenzyl)-4-tertiaryoctylphenol,
2-(β-phenethyl)phenol,
4-(β-phenethyl)phenol,
2-(3-phenylpropyl)phenol,
2-(4-phenylbutyl)phenol,
4-(4-phenylbutyl)phenol,
2,4-di(β-phenethyl)phenol,
2,6-di(β-phenethyl)phenol,
2-(β-phenethyl)-4-methylphenol,
2-(β-phenethyl)-4-tertiarybutylphenol,
2-(β-phenethyl)-4-butylphenol,
2-(β-phenethyl)-4-nonylphenol,
2-(β-phenethyl)-4-tertiaryoctylphenol,
2-ethyl-4-(β-phenethyl)phenol,
2-butyl-4-(β-phenethyl)phenol,
2-tertiarybutyl-4-(β-phenethyl)phenol,
2-(3-phenylpropyl)phenol,
2(4-phenylbutyl)phenol,
2(3-phenylpropyl)-4-methylphenol,
2(4-phenylbutyl)-4-ethylphenol,
2(3-phenylpropyl)-4-tertiarybutylphenol,
2(4-phenylbutyl)-4-tertiarybutylphenol,
2(4-phenylbutyl)-4-nonylphenol,
2,4,6-tri(β-phenethyl)phenol,
2,6-di(β-phenethyl)-4-ethylphenol,
2,6-di(β-phenethyl)-4-tertiarybutylphenol,
2,6-di(3-phenylpropyl)-4-methylphenol,
2,6-di(4-phenylbutyl)-4-tertiarybutylphenol,
2,6-di(4-phenylbutyl)-4-tertiaryoctylphenol,
2,4,6-tri(4-phenylbutyl)phenol,
2-allylphenol,
4-allylphenol,
2(1-butenyl)phenol,
4(1-butenyl)phenol,
2(1-pentenyl)phenol,
4(1-pentenyl)phenol,
2,4-diallylphenol,
2-allyl-4-methylphenol,
2-ethyl-4-allylphenol,
2-allyl-4-tertiarybutylphenol,
2-allyl-4-nonylphenol,
2-allyl-4-tertiaryoctylphenol,
2-butyl-4-allylphenol,
2-tertiaryoctyl-4-allylphenol,
2,4,6-triallylphenol,
2,6-diallyl-4-methylphenol,
2,4-diallyl-6-propylphenol,
2,4-diallyl-6-tertiarybutylphenol,
2,6-diallyl-4-tertiaryoctylphenol,
2,6-diallyl-4-nonylphenol, 2,4,6-tri(1-butenyl)phenol,
2,6-di(1-butenyl)-4-methylphenol,
2,6-di(1-butenyl)-4-propylphenol,
2,6-di(1-pentenyl)-4-tertiarybutylphenol,
2-(1-phentenyl)-4,6-ditertiarybutylphenol,
2-(1-butenyl)-4,6-dimethylphenol,
2-(1-pentenyl)-4-tertiaryoctyl-6-propylphenol,
2-(1-butenyl)-4-tertiaryoctyl-6-methylphenol,
2-phenylphenol,
4-phenylphenol,
2-phenyl-4-methylphenol,
2-phenyl-6-butylphenol,
2-phenyl-4-tertiarybutylphenol,
2-phenyl-6-tertiaryoctylphenol,
2-phenyl-4-nonylphenol,
2-ethyl-4-phenylphenol,
2-tertiarybutyl-4-phenylphenol,
2-allyl-4-phenylphenol,
2-phenyl-4(1-butenyl)phenol,
2-phenyl-4-benzylphenol,
2-(β-phenethyl)-4-phenylphenol,
2-phenyl-4-(α-methyl benzyl)phenol,
2-(α-ethylbenzyl)-4-phenylphenol,
2-phenyl-4,6-dimethylphenol,
2-phenyl-4-tertiarybutyl-6-ethylphenol,
2-phenyl-4-nonyl-6-butylphenol,
2-phenyl-4-tertiaryoctyl-6-tertiarybutylphenol,
2,6-dimethyl-4-phenylphenol,
2,6-ditertiarybutyl-4-phenylphenol,
2,6-dihexyl-4-phenylphenol,
2-phenyl-4,6-dibenzylphenol,
2,6-di(α-methyl benzyl)-4-phenylphenol,
2,6-diallyl-4-phenylphenol,
2-phenyl-4,6-di(1-butenyl)phenol,
2-(3-phenylpropyl)-4-phenyl-6-tertiarybutylphenol,
2,4-diphenylphenol,
2,6-diphenylphenol,
2,4,6-triphenylphenol,
2,4-diphenyl-6-methylphenol,
2,6-diphenyl-4-butylphenol,
2,6-diphenyl-4-tertiaryoctylphenol,
2,4-diphenyl-6-tertiarybutylphenol,
2,6-diphenyl-4-allylphenol,
2,4-diphenyl-6-(1-pentenyl)phenol,
2,6-diphenyl-4-benzylphenol,
2,4-diphenyl-6-(α-methyl benzyl)phenol,
2,6-diphenyl-4(β-phenethyl)phenol,
2-fluorophenol,
4-chlorophenol,
2-bromophenol,
2-fluoro-6-methylphenol,
2-butyl-4-chlorophenol,
2-bromo-4-tertiarybutylphenol,
2-chloro-6-tertiaryoctylphenol,
2-bromo-4-allylphenol,
2-fluoro-4-phenylphenol,
2-chloro-4-benzylphenol,
2-bromo-6-(β-phenethyl)phenol,
2-(α-methylbenzyl)-4-chlorophenol,
2-(1-butenyl)-4-fluorophenol,
2,6-ditertiarybutyl-4-chlorophenol,
2-fluoro-4-butyl-6-methylphenol,
2,6-dimethyl-4-bromophenol,
2-chloro-4-tertiaryoctyl-6-allylphenol,
2-(1-butenyl)-4-bromo-6-allylphenol,
2-fluoro-4-phenyl-6-methylphenol,
2,6-diphenyl-4-chlorophenol,
2-bromo-4-allyl-6-butylphenol,
2-nitrophenol,
4-nitrophenol,
2-nitro-4-methylphenol,
2-nitro-4-tertiarybutylphenol,
2-tertiaryoctyl-4-nitrophenol,
2-allyl-4-nitrophenol,
2-nitro-4(1-butenyl)phenol,
2-nitro-4-phenylphenol,
2-benzyl-4-nitrophenol,
2-nitro-4-(α-methylbenzyl)phenol,
2-nitro-4-butyl-6-methylphenol,
2,6-ditertiarybutyl-4-nitrophenol,
2-nitro-4,6-ditertiaryoctylphenol,
2-allyl-4-nitro-6-ethylphenol,
2-nitro-4-phenyl-6-methylphenol,
2-nitro-4-phenyl-6-allylphenol,
2-nitro-4-tertiarybutyl-6-benzylphenol,
2,6-diteriaryoctyl-4-nitrophenol.

Exemplary polyhydric phenols are catechol,
4-methylcatechol,
4-tertiarybutylcatechol,
4-allylcatechol,
4-phenylcatechol,
4-(β-phenethyl)catechol,
4,6-dimethylcatechol,
4,6-ditertiaryoctylcatechol,
4-allyl-6-tertiarybutylcatechol,
4-methyl-6-benzylcatechol,
hydroquinone,
2,6-dimethylhydroquinone,
2-ethyl-6-tertiarybutylhydroquinone,
2,6-ditertiaryoctylhydroquinone,
2-tertiarybutyl-6-allylhydroquinone,
2-butyl-6-phenylhydroquinone,
2,6-diphenylhydroquinone,
2-phenyl-6-(1-butenyl)hydroquinone,
2-(β-phenethyl)-6-phenethylhydroquinone,
2-methyl-6-(α-methylbenzyl)hydroquinone.

Exemplary of polynuclear phenols are 4,4'-methylenediphenol,
4,4'-ethylenediphenol,
4,4'-isopropylidenediphenol,
4,4'-methylenebis(2-methylphenol),
4,4'-methylenebis(2-tertiarybutylphenol),
4,4'-ethylenebis(2-tertiaryoctylphenol),
4,4'-isopropylidenebis(2-tertiarybutylphenol),
4,4'-methylenebis(2,6-diethylphenol),
4,4'-ethylenebis(2,6-ditertiaryoctylphenol),
4,4'-isopropylidenebis(2,6-ditertiarylbutylphenol),
4,4'-isopropylidenebis(2-methyl-6-tertiarybutylphenol),
4,4'-ethylenebis(2-ethyl-6-tertiaryoctylphenol),
4,4'-oxydiphenol,
4,4'-oxybis(2-propylphenol),
4,4'-oxybis(2-methylphenol),
4,4'-oxybis(2-tertiarybutylphenol),
4,4'-oxybis(2,6-diethylphenol),
4,4'-oxybis(2,6-ditertiarybutylphenol),
4,4'-thiodiphenol,
4,4'-thiobis(2-methylphenol),
4,4'-thiobis(2-butylphenol),
4,4'-thiobis(2-tertiaryoctylphenol),
4,4'-thiobis(2,6-diethylphenol),
4,4'-thiobis(2,6-ditertiarybutylphenol),
4,4'-oxydimethylenediphenol,
4,4'-oxydimethylenebis(2-methylphenol),
4,4'-oxydimethylenebis(2-tertiarybutylphenol),
4,4'-oxydimethylenebis(2-nonylphenol),
4,4'-oxydimethylenebis(2,6-diethylphenol),
4,4'-oxydimethylenebis(2,6-ditertiarybutylphenol).
4,4'-oxydimethylenebis(2-methyl-6-amylphenol),
thiodimethylenediphenol,
4,4'-thiodimethylenebis(2-ethylphenol),
4,4'-thiodimethylenebis(2-tertiaryoctylphenol),
4,4'-thiodimethylenebis(2-nonylphenol),
4,4'-thiodimethylenebis(2,6-dimethylphenol),
4,4'-thiodimethylenebis(2-propyl-6-tertiarybutylphenol),
4,4'-cyclohexylidenediphenol,
4,4'-cyclohexylidenebis(2-methylphenol),
4,4'-cyclohexylidenebis(2-propylphenol),
4,4'-cyclohexylidenebis(2-tertiaryoctylphenol),
4,4'-cyclohexylidenebis(2,6-diisopropylphenol), 4,4'-cyclohexylidenebis(2-ethyl-6-tertiarybutylphenol),
4,4'-1,4-cyclohexylenediphenol,
4,4'-1,4'-cyclohexylenebis(2-methylphenol),
4,4'-1,4'-cyclohexylenebis(2-amylphenol),
4,4'-1,4'-cyclohexylenebis(2-tertiaryoctylphenol),
4,4'-1,4'-cyclohexylenebis(2,6-dimethylphenol),
4,4'-1,4'-cyclohexylenebis(2,6-dihexylphenol),
4,4'-1,4'-cyclohexylenebis(2-ethyl-6-tertiarybutylphenol),
4,4'-1,4-phenylenediphenol,
4,4'-1,4-phenylenebis(2-ethylphenol),
4,4'-1,4-phenylenebis(2-tertiarybutylphenol),
4,4'-1,4-phenylenebis(2-isopropyl-6-amylphenol),
4,4'-1,4-phenylenebis(2,6-ditertiaryoctylphenol),
4,4'-[oxybis(ethylenethiomethylene)]diphenol,
4,4'-[oxybis(ethylenethiomethylene)]bis(2-methylphenol),
4,4'-[oxybis(ethylenethiomethylene)]bis(2-amylphenol),
4,4'-[oxybis(ethylenethiomethylene)]bis(2-tertiaryoctylphenol),
4,4'-[oxybis(ethylenethiomethylene)]bis(2-methyl-6-tertiarybutylphenol).

Exemplary of dithiocarbamoyl phenols are 2-methyl-4-(dimethylaminodithiocarbamoylmethyl)-6-tertiarybutylphenol,
2,6-dimethyl-4-(dimethyldithiocarbamoylmethyl)phenol,
2,6-ditertiarybutyl-4-(dimethylaminodithiocarbamoylmethyl)phenol,
2-ethyl-4-(diphenylaminodithiocarbamoylmethyl)-6-teritaryoctylphenol,
2-methyl-4-(dibenzylaminodithiocarbamoylmethyl)-6-tertiarybutylphenol,
2,6-ditertiarylbutyl-4-(ditertiaryoctylaminodithiocarbamoylmethyl)phenol,
2,6-diisopropyl-4-(diethylaminodithiocarbamoylethyl)phenol,
2-methyl-4-(diamylaminodithiocarbamoylethyl)-6-tertiarybutylphenol,
2-amyl-4-(ditertiarybutylaminodithiocarbamoylpentyl)-6-tertiaryoctylphenol,
2,6-diethyl-4-(dibenzylaminodithiocarbamoylpentyl)phenol,
2,6-ditertiaryoctyl-4-(dinonylaminodithiocarbamoylpentyl)phenol,
4-dimethylaminodithiocarbamoylmethylphenol,
4-ditertiarybutylaminodithiocarbamoylethylphenol,
2-tertiarybutyl-4-(ditertiaryoctylaminodithiocarbamoylpropyl)phenol,
2-methyl-4-(diamylaminodithiocarbamoylpentyl)phenol),
2-amyl-4-(dimethylaminodithiocarbamoylpentyl)phenol,
2-tertiaryloctyl-4-(diphenylaminodithiocarbamoylmethyl)phenol,
4-dibenzylaminodithiocarbamoylethylphenol.

From the foregoing non-limiting listing of phenols, many more will be apparent to those skilled in the art. Additionally, conventional phenolic antioxidants useful in the invention are disclosed in U.S. Pats. 3,115,465, Orloff et al. (see especially col. 3, lines 4 ff.); 3,310,587, O'Shea, Mar. 21, 1967; 3,330,804, O'Shea, July 11, 1967; British Pat. 846,684, Petrochemicals, Ltd., Aug. 31, 1960 (see especially page 2, lines 38 ff.); and Industrial and Engineering Chemistry, vol. 41, No. 7, p. 1442.

Considering now the second component (b) of the present ternary synergistic antioxidant combination, namely the sulfide or thioester, this component includes the organic monosulfides and disulfides having the general formula:

$$R_9-A-R_{10}$$

where A is a diradical such as —S—; —S—S—;

and $R_9$ and $R_{10}$ can be alike or different and are radicals such as alkyl, cycloalkyl, aryl, heterocyclic and hydrocarbon substituted analogues thereof (e.g., aralkyl, alkaryl). $R_{11}$ in turn may be exemplified by an alkylene, arylene, alkylenearylene, cycloalkylene or heterocyclic diradical.

Representative examples of alkyl sulfides are: butyl sulfide, pentyl sulfide, hexyl sulfide, heptyl sulfide, octyl sulfide, decyl sulfide, dodecyl sulfide, tetradecyl sulfide, hexadecyl sulfide, octadecyl sulfide, eicosyl sulfide and hydrocarbon substituted analogues thereof such as benzyl sulfide, phenethyl sulfide, phenylpropyl sulfide and phenylbutyl sulfide.

Representative examples of cycloalkyl sulfides are cyclobutyl sulfide, cyclopentyl sulfide, cyclohexyl sulfide and cyclooctyl sulfide.

Representative examples of alkyl aryl sulfides are benzyl phenyl sulfide, phenethyl sulfide, ethyl phenyl sulfide, butyl phenyl sulfide, hexyl phenyl sulfide and hydrocarbon substituted analogues thereof.

Representative examples of aryl sulfides are phenyl sulfide, naphthyl sulfide and hydrocarbon substituted analogues thereof.

Representative examples of heterocyclic sulfides are thienyl sulfide, thenyl sulfide, furyl sulfide, furfuryl sulfide, pyrrolyl sulfide, pyridyl sulfide, pyranyl sulfide, morpholinyl sulfide, thiazolyl sulfide, pyrazolyl sulfide, pyrimidinyl sulfide, pyrazinyl sulfide, pyridazinyl sulfide, benzothiazolyl sulfide and hydrocarbon substituted analogues thereof.

Representative examples of the bissulfides

are 1,2-bis(phenylthio) ethane, bis(phenylthio) methane, 1,3-bis(phenylthio) propane, 2,2'-bis(phenylthio) propane, 1,4-bis(phenylthio) butane, 1,5-bis(phenylthio) pentane and hydrocarbon substituted analogues thereof.

Representative examples of the disulfides are dibutyl disulfide, dipentyl disulfide, dihexyl disulfide, dioctyl disulfide, didecyl disulfide, didodecyl disulfide, ditetradecyl disulfide, dihexadecyl disulfide, dioctadecyl disulfide, dieicosyl disulfide and hydrocarbon substituted analogues thereof such as benzyl disulfide, phenethyl disulfide, phenylpropyl disulfide, phenylbutyl disulfide.

Representative examples of heterocyclic sulfides are thienyl disulfide, thenyl disulfide, furyl disulfide, furfuryl disulfide, pyrrolyl disulfide, pyridyl disulfide, pyranyl disulfide, morpholinyl disulfide, thiazolyl disulfide, pyrazolyl disulfide, pyrimidinyl disulfide, pyrazinyl disulfide, pyridazinyl disulfide, benzothiazolyl disulfide and hydrocarbon substituted analogues thereof.

Representative examples of aryl disulfides are phenyl disulfide, naphthyl disulfide and hydrocarbon substituted analogues thereof.

Representative examples of bisdisulfides are 1,2-bis(phenyldithio) ethane, bis(phenyldithio) methane, 1,3-bis(phenyldithio) propane, 2,2'-bis(phenyldithio) propane, 1,4-bis(phenyldithio) butane, 1,5-bis(phenyldithio) pentane and hydrocarbon substituted analogues thereof.

The remaining type of sulfur-containing second component (b) employed in the invention, namely, the thioester type, is represented by the dialkylthiodialkanoates, many of which have the general formula:

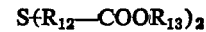

where $R_{12}$ is a divalent hydrocarbon radical containing from one to six carbon atoms and $R_{13}$ is selected from the group consisting of alkyl radicals containing from 6 to 20 carbon atoms, aryl radicals containing 6 to 20 carbon atoms, aralkyl radicals containing from 7 to 20 carbon atoms.

Representative examples of these esters are dilaurylthiodipropionate, diamylthiodiacetate, β,β - thiobis(cetylbutyrate), dieicosylthiodiheptoate, diphenylthiodipropionate, dibenzylthiodiacetate, and distearylthiodipropionate.

The third component (c) of the present synergistic ternary antioxidant combination is, as indicated, either an epoxide or an aryl phosphite. Considering first the epoxides, these usually fall into one of the following categories:

(i) epoxidized soybean oil;
(ii) epoxidized higher fatty acid ester;
(iii) an epoxide of a straight chain alpha-olefin;
(iv) an epoxide of a diolefin homopolymer; and
(v) diglycidyl ether type of bisphenol A (4,4'-isopropylidenediphenol).

Various epoxidized soybean oils are available commercially, as represented by such products as Paraplex G–60, G–61 and G–62, and Flexol EPO. Epoxidized higher fatty acid esters are typified by esters of fatty acids having 10 to 30 carbon atoms in the chain with alkanols having up to 10 carbon atoms (e.g., methyl alcohol, octyl alcohol, decyl alcohol, and the like). They are represented by such commercial materials as Drapex 3.2 (octyl epoxy stearate having a molecular weight of 410) or Monoplex–71 (an epoxidized oleate ester with an average molecular weight of 380). The epoxy alpha-olefins are usually made by treating a straight chain alpha-olefin with oxygen under pressure in the presence of a catalyst such as molybdenum carbonyl or molybdenum naphthenate. An important epoxide of a diolefin homopolymer is epoxidized polybutadiene, as represented by the commercial material known as "Oxiron" containing 10% epoxy, iodine number 185, viscosity 1800 poises at 25° C. (see U.S. Pat. 2,829,135). Epoxide contents in such materials frequently run from about 2% to about 15%. The epoxy resins which are diglycidyl ether types of bisphenol A are usually made in known manner by reacting bisphenol A with epichlorohydrin. Commercial examples are Epon 820, Epon 826, Epon 828, Epon 830 and similar types which usually have an epoxy equivalent of 125 to 4,000 and a viscosity in the range of from 100 to 59,000 centipoises at 25° C.

In place of an epoxide, phosphite ester may constitute the third component (c) to be used along with the phenolic compound (a)) and sulfide or thioester (b) in the synergistic combination of the invention. Such phosphite ester is frequently characterized by the structural formula:

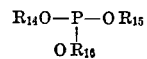

wherein $R_{14}$, $R_{15}$ and $R_{16}$ are hydrocarbon radicals selected from the group consisting of alkyl, aryl, cycloalkyl and combinations thereof such as alkaryl and aralkyl having 1 to 30 carbon atoms. The aryl phosphite is typically a triaryl phosphite, especially a triphenyl phosphite in which the phenyl groups are substituted with alkyl radicals, preferably higher alkyl groups (e.g., $C_8$–$C_{30}$), as described in U.S. Pat. 2,733,226, Hunter, January 31, 1956. Some examples of these are: tri(o-octylphenyl) phosphite, tri(p-nonylphenyl)phosphite, tri(p-dodecylphenyl) phosphite, tri(dinonylphenyl) phosphite, mono(nonylphenyl) di(octylphenyl) phosphite, tri(mixed nonylated phenyl) phosphite and the like. Other organic phosphite esters that may be employed as the third component are: trimethyl phosphite, trieicosyl phosphite, diphenyl 2-ethylhexyl phosphite, di-isooctyl tolyl phosphite, tri-2-ethylhexyl phosphite, phenyl dicyclohexyl phosphite, phenyl diethyl phosphite, triphenyl phosphite, octyl phosphite, isobutyl phosphite, tricresyl phosphite, tri(2,3-dimethylphenyl) phosphite, trioctadecyl phosphite, triisooctyl phosphite, triodecyl phosphite, isooctyl diphenyl phosphite, diisooctyl phenyl phosphite, tri(2-octylphenyl) phosphite, tri(3-nonylphenyl phosphite, benzyl methyl isopropyl phosphite, butyl dicresyl phosphite, isooctyl di(2-octylphenyl) phosphite, di(2-ethylhexyl) 3-isooctylphenyl phosphite, tri(2-cycloexylphenyl) phosphite, tri-2-naphthyl phosphite, tri(3-phenylphenyl) phosphite, tri(2-phenylethyl) phosphite, tridodecyl phosphite, tri-4-tert-butylphenyl phosphite, dodecyl diphenyl phosphite and 4-tert-butylphenyl di-2-ethylhexyl phosphite.

In practicing the invention, the stabilizer mixture, consisting of (a) the phenolic compound and (b) the organic sulfide or thioester, along with (c) either the epoxide or phosphite ester as the third ingredient, may be mixed with the hydrocarbon elastomer by any conventional method. The ingredients may be added to the polymer on an open mill, or in an internal mixer. Alternatively, the ingredients may be added to the solution in which the polymer is prepared, at the conclusion of the polymerization or prior to the recovery of the polymer from the solution. The synergistic additives may be added individually or in admixture.

Usually the amount of phenolic compound (a) employed will be within the range of from 0.025 to 1 part, per 100 parts by weight of the polymer to be stabilized. Each of the other synergistic additives [that is, the organic sulfide or thioester (b) and the epoxide or phosphite ester (c)] is usually employed in an amount from 0.25 to 2.5 parts, preferably from 0.25 to 1.25 parts, per 100 parts by weight of the polymer. The preferred concentration of the phenol depends in large part on the nature of the phenol. Those phenols such as unhindered mononuclear phenols which are not in themselves antioxidants, are preferably employed at a concentration of from 0.25 to 1.0 phr. (parts per hundred of rubber). On the other hand, those phenols which are antioxidants, including the hindered mononuclear phenolic antioxidants and the hindered bisphenols, are ordinarily used at less than the 0.5 part level in the present combination. In the case of the unhindered bisphenolic antioxidants, the remarkable feature of the invention is that it permits very low levels of phenol, 0.025 to 0.08 part, far less than the amount that would be required for protection if not used in combination with the other two synergistic components (b) and (c).

The composition of the invention may further include any other suitable desired compounding ingredients, such as vulcanizing agents, accelerators, activators, retarders, pigments, or fillers (e.g., carbon black, silica, etc.), processing aids, extender oils and other conventional ingredients.

The invention is applicable to stabilization or prevention of oxidative deterioration in the unvulcanized polymer. Thus, the invention protects the uncured rubber during the period between completion of the polymerization reaction in which the polymer is manufactured, and the recovery of the polymer, as well as during washing, drying at elevated temperatures, packaging, shipment and storage of the polymer. The stabilizer system of the invention also protects the polymer during the compounding, processing, and/or fabrication operations associated with the manufacture of such articles as tires, belts, hose, footwear, coated fabrics, and the like.

To determine the effectiveness of the synergistic combination, different measures of the resistance of the polymer composition to oxidation may be used. The method employed in the examples herein involves determining the time required for a specimen weighing approximately two grams to absorb 20 cubic centimeters of oxygen per gram in an atmosphere of oxygen, at a specified temperature, at atmospheric pressure. This time is reported in the examples in minutes, as $t_{20}$.

The following examples, in which all quantities are expressed by weight, illustrate the practice of the invention in more detail.

EXAMPLE 1

This example shows that neither dilaurylthiodipropionate (b) nor epoxidized soybean oil (c) is a good antioxidant, and neither has much effect on the efficiency of 4,4'-isopropylidene bisphenol (a) as an antioxidant, but all three taken together form an effective combination.

To specimens of a washed EPDM cement (i.e., a solution, in n-hexane, of ethylene-propylene-dicyclopentidiene terpolymer rubber containing 62% by weight of ethylene and 6% by weight of dicyclopentadiene; intrinsic viscosity of 2.1 in Tetralin at 135° C.), containing no other stabilizer, the preservative chemicals indicated in Table I are added (as solutions in n-hexane or benzene), in the amounts shown in the table. The amounts of additives in the table are expressed as parts per hundred of rubber (phr.), by weight. The resulting solutions are poured into rectangular glass dishes (8 inches wide and 12 inches long) and the solvent is allowed to evaporate overnight at room temperature. The resulting polymer films are then individually wrapped on glass tubes (1 inch in diameter and 10 inches long), given a final five minute drying in vacuo at 150° C., and then tested immediately thereafter in an oxygen atmosphere at 150° C. by the oxygen-absorption test described above. In this example the phenolic material (a) employed is a bisphenol, 4,4'-isopropylidene bisphenol. The sulfur-containing chemical (b) is a thioester, dilaurylthiodipropionate (indicated as DLTDP in the table). The third synergistic component (c), an epoxide, is a commercial epoxidized soybean oil, Paraplex G–62, average molecular weight 1000, density 0.999, freezing point 2° C., viscosity 3–4 poises at 25° C.

The time for the sample to absorb 20 cc. of oxygen per gram in the test is reported in Table I as $t_{20}$. The amount of discoloration in each sample at the end of the test is also noted, as well as the tackiness. Development of tackiness is an indication of molecular weight breakdown of the polymer. Development of color in the polymer is a visual indication of the degradation; the darker the color the less satisfactory the stabilizer system.

EXAMPLE II

Combinations shown in this and other examples of the invention are particularly useful for stabilization of rubber to be used in light-colored end products, because they provide not only substantial resistance to thermal oxidation but also prevent development of intense coloration during aging. This is not possible in general with phenols alone, which frequently tend to cause discoloration when used at the high concentrations required for oxidation resistance.

In this example a series of specimens are prepared, using the same EPDM as in Example I and according to the same procedure. In certain samples (samples Nos. II–1, II–2 and II–3 in Table II, below) the phenolic ingredient (a) employed is 4,4'-isopropylidene bisphenol, while in other samples (II–4 and II–5 in Table II) the phenolic ingredient (a) is 4,4'-cyclohexylidene bisphenol; in each case the amount of phenolic material is 0.05 phr. (parts per hundred of rubber). The sulfur-containing ingredient (b) is again the thioester, dilaurylthiodipropionate (DLTDP), in the amounts shown in Table II, while the third component (c) of the synergistic stabilizing combination is either the epoxide of Example I, namely epoxidized soybean oil, or a phosphite ester, namely tris(nonylphenyl) phosphite ("Polygard"). The aging test is carried out in oxygen at 150° C. as in Example I, with the results noted in Table II.

TABLE I.—SYNERGISTIC COMBINATION OF THREE ADDITIVES IN EPDM

| Sample No. | Amount of additive (phr.) | | | $t_{20}$ | Appearance |
|---|---|---|---|---|---|
| | Bisphenol | DLTDP | Epoxide | | |
| I–1 | | | | 29 | Dark brown, very tacky. |
| I–2 | | 1.5 | | 82 | Do. |
| I–3 | | | 1.5 | 36 | Do. |
| I–4 | 0.08 | | | 206 | Light brown, tacky. |
| I–5 | 0.05 | | | 144 | Brown, tacky. |
| I–6 | 0.10 | | 1.5 | 353 | Very slight discoloration, very slight tackiness. |
| I–7 | 0.05 | 1.0 | | 191 | Brown, tacky. |
| I–8 | 0.10 | 1.0 | | 333 | Very slight discoloration, very slight tackiness. |
| I–9 | 0.05 | 1.0 | 1.0 | (1) | No discoloration, non-tacky. |
| I–10 | | 2.5 | 2.5 | 160 | Dark brown, tacky. |

[1] Test discontinued at 460 minutes, at which time the sample had absorbed only 2.6 cc./gm. of oxygen.

TABLE II.—STABILIZATION OF EPDM

| Sample No. | Amount of additive (phr.) | | | | $t_{20}$ | Appearance |
|---|---|---|---|---|---|---|
| | Phenol (0.05 phr.) | DLTDP | Epoxide | Phosphite ester | | |
| II–1 | 4,4'-isopropylidene bisphenol. | | | | 135 | Brown, tacky. |
| II–2 | do | 0.5 | 0.5 | | 369 | No discoloration, non tacky. |
| II–3 | do | 0.5 | | 0.5 | 249 | Very slight discoloration, non-tacky. |
| II–4 | 4,4'-cyclohexylidene bisphenol. | | | | 178 | Brown, tacky. |
| II–5 | do | 0.5 | | 0.5 | 415 | No discoloration, non-tacky. |

In Table I, sample I–9 containing all three additives represents the practice of the invention; the other samples are included for purposes of comparison. It will be noted that sample I–9 was unaffected by the oxidizing atmosphere as evidenced by the lack of development of color and tackiness. All of the other samples showed varying degrees of molecular weight breakdown as evidenced by development of color and tackiness. Sample I–9 absorbed only 2.6 cc./g. of oxygen after 460 minutes, whereas all the other samples had already absorbed 20 cc./gm. in less than 460 minutes, indicating a wide disparity in effectiveness between sample I–9 and the others. The antioxidant activity of sample I–9 was therefore demonstrated to be very substantially superior to what could be expected from the sum of the antioxidant actions of the components individually or in various pairs. Especially noteworthy is the ability to reduce the concentration of phenol to a very low level (far below the concentration of phenol necessary when the phenol is used alone) and still achieve a remarkably enhanced resistance to oxidation and discoloration.

In Table II it will be seen that the EPDM samples containing all three of the preservative ingredients had great resistance to oxidation as evidenced by high $t_{20}$ values.

EXAMPLE III

This example shows that an unhindered monophenol such as p-chlorophenol, which itself is a non-antioxidant for EPDM rubbers, unexpectedly exhibits a synergistic antioxidant activity when it is combined with an epoxide (epoxidized soybean oil, "Paraplex G–62") and an organic disulfide, namely, bis-(2-benzothiazyl)disulfide, identified as "MBTS" in Table III. Also included in this example are the phenolic materials Agerite Spar, which is a mixture of mono-, di- and tri-styrenated phenol and 2-methyl-4-(dimethylaminodithiocarbamoylmethyl) - 6 - tertiary-butylphenol, designated as MDTBP in Table III, along with dilaurylthiodipropionate (DLTDP) in various combinations. The EPDM employed is the same as in Example I, as are the method of preparing the specimens and the test method.

TABLE III.—STABILIZATION OF EPDM

| Sample No. | Amount of additive (phr.) | | | $t_{20}$ |
|---|---|---|---|---|
| | p-Chloro-phenol | MBTS | Epoxide | |
| III-1 | 0.625 | | | 40 |
| III-2 | | 2.5 | | 51 |
| III-3 | | | 0.625 | 72 |
| III-4 | 0.625 | 2.5 | | 64 |
| III-5 | 0.625 | | 0.625 | 70 |
| III-6 | | 2.5 | 0.625 | 176 |
| III-7 | 0.625 | 2.5 | 0.625 | 270 |
| | Agerite spar | | DLTDP | |
| III-8 | 0.25 | | | 345 |
| III-9 | | | 2.5 | 160 |
| III-10 | 0.25 | | 2.5 | (1) |
| | MDTBP | | | |
| III-11 | 0.25 | | | 160 |
| III-12 | 0.25 | | 2.5 | 420 |

[1] This sample had absorbed only 1.8 cc./gm. of oxygen by the conclusion of the test (466 minutes).

In Table III, samples III-7, III-10 and III-12 represent the practice of the invention. Each of these gives the highest $t_{20}$ value in its own series, indicating the superior antioxidant activity of the three-component combination. Sample III-10 is particularly remarkable for the fact that at the time the test is discontinued (466 minutes) it has absorbed a mere 1.8 cc./gm. of oxygen, so resistant is it to oxidation. Particularly remarkable is the resistance to development of color and tackiness in the compositions of the invention, indicating that the ternary composition in each series has the greatest resistance to molecular weight breakdown; in each series the other compositions display tackiness and/or discoloration.

EXAMPLE IV

This example shows synergistic combinations based on an alpha-olefin oxide as the epoxy component (c), namely, a commercial preparation of material of the formula

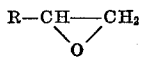

where R is $C_{13-16}$ straight chain alkyl, known as Neodox 1518, which has an oxirane value of 6.2%, an iodine value of 5.4, an acid value of 0.1, a saponification value of 4.2, a viscosity of 6.0 centipoises at 25° C., a specific gravity of 0.84, a flash point of 164° C., a boiling point range of 105-150° C. at 1 mm. of mercury, and a molecular weight of 245. The sulfur-containing components (b) employed are ethylene bis(phenyl sulfide), designated as EB(PS) in Table IV, benzyl disulfide (BDS in Table IV), or dilaurylthiodipropionate (DLTDP in Table IV). The phenolic component (a) is p-chlorophenol. The elastomer employed is the same EPDM as in previous examples, and the sample preparation and testing are carried out as before, with the results shown in Table IV.

TABLE IV.—STABILIZATION OF EPDM

| Sample No. | Additives (phr.) | | | $t_{20}$ |
|---|---|---|---|---|
| | p-Chloro phenol | EB(PS) | Neodox epoxide | |
| IV-1 | 0.625 | 0.625 | | 53 |
| IV-2 | 0.625 | | 1.25 | 48 |
| IV-3 | | 0.625 | 1.25 | 167 |
| IV-4 | 0.28 | 0.28 | 0.51 | (1) |
| IV-5 | 0.625 | | | 40 |
| | | BDS | | |
| IV-6 | | 0.625 | 1.25 | 293 |
| IV-7 | 0.625 | 0.625 | | 109 |
| IV-8 | 0.28 | 0.28 | 0.51 | (2) |
| | | DLTDP | | |
| IV-9 | 0.625 | 0.625 | | 87 |
| IV-10 | | 0.625 | 2.5 | 290 |
| IV-11 | 0.28 | 0.28 | 0.51 | (3) |
| IV-12 | | 1.5 | | 82 |

[1] Only 12.5 cc./gm. of oxygen absorbed at 450 minutes. when test was discontinued.
[2] Only 3.4 cc./gm. of oxygen absorbed at 450 minutes. when test was discontinued.
[3] Only 8.1 cc./gm. of oxygen absorbed at 450 minutes. when test was discontinued.

In Table IV it will be seen that samples IV-4, IV-8 and IV-11 of the invention had absorbed far less than 20 cc./gm. of oxygen when the test was terminated. All other samples had absorbed the full 20 cc./gm. in shorter times. In addition, samples IV-4, IV-8 and IV-11 displayed no discoloration and no tackiness at the end of the test, whereas all the other samples did show tackiness and discoloration, indicating molecular weight breakdown.

EXAMPLE V

This example shows other phenols in synergistic antioxidant combinations with epoxides and sulfides. The evaluation of these effective three-component combinations is carried out in the same ethylene-propylene-dicyclopentadiene terpolymer as in previous examples, using the same test procedure, with the results shown in Table V. The 2-allyphenol can be considered as an example of a hindered monophenol. In Table V BDS identifies benzyl disulfide, EP(PS) identifies ethylene bis(phenyl sulfide), and DDS identifies dodecyl sulfide. The Neodox epoxide in Table V is the same olefin epoxide material as previously described in Example IV. The epoxidized soybean oil in Table V is the same material as described in Example I.

TABLE V.—STABILIZATION OF EPDM

| Sample No. | Additives (phr.) | | | $t_{20}$ |
|---|---|---|---|---|
| | 2-allyl phenol | BDS | Neodox epoxy | |
| V-1 | 0.625 | | 1.25 | 40 |
| V-2 | 0.625 | 0.625 | | 126 |
| V-3 | 0.625 | 0.625 | 1.25 | >420 |
| | | EB(PS) | | |
| V-4 | 0.625 | 0.625 | | 45 |
| V-5 | 0.625 | 0.625 | 1.25 | >420 |
| V-6 | | 0.625 | | 27 |
| | p-Phenyl phenol | | | |
| V-7 | 0.125 | 0.625 | | 104 |
| V-8 | 0.125 | 0.625 | 1.25 | [1] >420 |
| | | DDS | | |
| V-9 | 0.125 | 0.625 | | 413 |
| V-10 | 0.125 | 0.625 | 1.25 | [2] >420 |
| | | BDS | | |
| V-11 | 0.125 | | 1.25 | 150 |
| V-12 | 0.125 | 0.625 | | 349 |
| V-13 | 0.125 | 0.625 | 1.25 | [3] >420 |
| | Phenol | DDS | Epoxy soybean oil | |
| V-14 | 1.0 | | | 43 |
| V-15 | 1.0 | | 1.0 | 42 |
| V-16 | | 0.625 | | 60 |
| V-17 | 1.0 | 1.0 | 1.0 | 215 |
| | | BDS | | |
| V-18 | | 0.28 | | 99 |
| V-19 | 1.0 | 1.0 | | 253 |
| V-20 | | 1.0 | 1.0 | 270 |
| V-21 | 1.0 | 1.0 | 1.0 | >420 |
| V-22 | | 2.5 | | 51 |

[1] 1.7 cc./gm. of oxygen absorbed.
[2] 4.3 cc./gm. of oxygen absorbed.
[3] 3.3 cc./gm. of oxygen abosrbed.

Samples V-3, V-5, V-8, V-10, V-13, V-17 and V-21 embody the practice of the invention and, in addition to having low oxygen absorption in the test as indicated in the table, are further remarkable for absence of discoloration and failure to develop tackiness as a result of the oxygen aging at elevated temperature.

EXAMPLE VI

This example illustrates the use of a diphenol type, namely, hydroquinone, as the phenolic component (a) of the synergistic combination. The same EPDM terpolymer elastomer and the same procedure are used, as in previous examples. Various samples, as indicated in Table VI, contain, as component (b), either ethylene bis (phenyl sulfide) designated as EB(PS), benzyl disulfide designated as BDS, dodecyl sulfide designated as DDS, dilaurylthiodipropionate designated as DLTDP, or n-octyl disulfide designated as n-ODS. As component (c) there is employed the olefin epoxide Neodex 1518 or the epoxidized soybean oil Paraplex G-62 as previously described.

TABLE VI.—STABILIZATION OF EPDM

| Sample No. | Additives (phr.) | | | $t_{20}$ |
|---|---|---|---|---|
| | Hydroquinone | EB(PS) | Neodex epoxy | |
| VI-1 | 0.625 | 0.625 | | 167 |
| VI-2 | | 0.625 | 1.25 | 90 |
| VI-3 | 0.625 | 0.625 | 1.25 | (1) |
| VI-4 | 0.250 | 0.625 | 1.25 | (2) |
| VI-5 | | | 0.625 | 27 |
| | | BDS | | |
| VI-6 | | 0.625 | | 116 |
| VI-7 | | 0.625 | 1.25 | 293 |
| VI-8 | 0.625 | 0.625 | | 293 |
| VI-9 | 0.625 | 0.625 | 1.25 | (3) |
| | | DDS | | |
| VI-10 | | 0.625 | | 60 |
| VI-11 | | 0.625 | 1.25 | 260 |
| VI-12 | 0.625 | 0.625 | | 120 |
| VI-13 | 0.625 | 0.625 | 1.25 | (4) |
| VI-14 | 0.625 | | | 60 |
| VI-15 | | | 1.25 | 42 |
| VI-16 | 0.625 | | 1.25 | 143 |
| | | DLTDP | Epoxy soybean oil | |
| VI-17 | 0.625 | | 2.5 | 136 |
| VI-18 | 0.625 | 2.5 | 2.5 | >420 |
| | | n-ODS | Neodox epoxy | |
| VI-19 | | 0.625 | | 67 |
| VI-20 | 0.625 | 0.625 | | 105 |
| VI-21 | | 0.625 | 1.25 | (5) |
| VI-22 | 0.625 | 0.625 | 1.25 | (6) |

1 0.9 cc./gm. O₂ absorbed at 420 minutes.
2 1.6 cc./gm. O₂ absorbed at 420 minutes.
3 0.03 cc./gm. O₂ absorbed at 420 minutes.
4 0.3 cc./gm. O₂ absorbed at 420 minutes.
5 10.8 cc./gm. O₂ absorbed at 420 minutes.
6 1.38 cc./gm. O₂ absorbed at 420 minutes.

In Table VI, samples VI-3, VI-4, VI-9, VI-13, VI-18 and VI-22 represent the practice of the invention. In comparing samples VI-21 and VI-22 it is important to note that sample VI-21 absorbed almost 10 times as much oxygen as sample VI-22 of the invention, that is, the binary disulfide (b)-epoxide (c) combination VI-22, although highly effective, did not display the even more enhanced synergism of ternary hydroquinone (a)-disulfide (b)-epoxide (c) combination VI-22.

Having thus described the invention, what is claimed and desired to protect by Letters Patent is:

1. A composition comprising an ethylene-propylene-non-conjugated diene terpolymer elastomer stabilized against oxidative deterioration by a ternary synergistic mixture of:
   (a) a phenolic material,
   (b) an organic sulfide or thioester, and
   (c) an epoxide or phosphite ester;
the amounts of (a) being from 0.025 to 1 part, the amount of (b) being from 0.25 to 2.5 parts and the amount of (c) being from 0.25 to 2.5 parts per 100 parts by weight of said elastomer;
the said (a) being a chemical of one of the formulas:

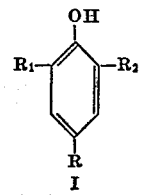
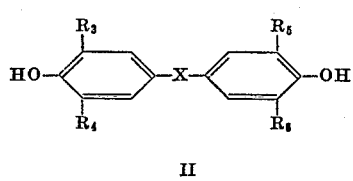

I  II wherein, in Formula I, R, $R_1$ and $R_2$ are the same or different and contain not more than 10 carbon atoms and are selected from the group consisting of hydrogen, alkyl, aralkyl, alkenyl, aryl and alkaryl, and one of R, $R_1$ and $R_2$ may further be halogen, nitro, hydroxyl, or an alkyl radical substituted with a symmetrically disubstituted dicarbamoyl radical

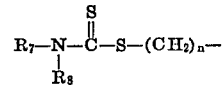

wherein $R_7$ and $R_8$ are the same or different and are selected from the group consisting of alkyl, aralkyl, aryl and alkaryl containing not more than 10 carbon atoms and $n$ is from 1 to 5, and wherein, in Formula II, $R_3$, $R_4$, $R_5$ and $R_6$ can be the same or different and are selected from the group consisting of hydrogen and alkyl having not more than 10 carbon atoms, and X is a single diradical selected from the group consisting of —O—, —S—, —CH₂—, —CH₂—CH₂—,

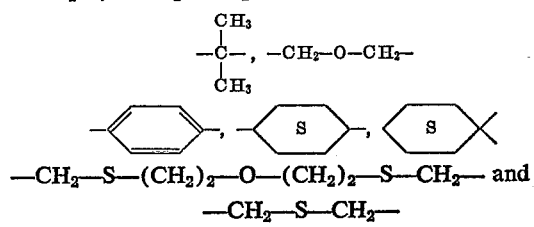

—CH₂—S—(CH₂)₂—O—(CH₂)₂—S—CH₂— and
—CH₂—S—CH₂— the said (b), when it is a sulfide, having the formula $$R_9—A—R_{10}$$

where A is a diradical selected from the group consisting of —S—, —S—S—, and —S—$R_{11}$S—, wherein $R_9$ and $R_{10}$ can be the same or different and are selected from the group consisting of alkyl, cycloalkyl, aryl, aralkyl, alkaryl and heterocyclic radicals, and $R_{11}$ is selected from the group consisting of alkylene, arylene, alkylenearylene, cycloalkylene and heterocyclic diradicals;

the said (b), when it is a thioester, having the formula

where $R_{12}$ is a divalent hydrocarbon radical containing from one to six carbon atoms and $R_{13}$ is selected from the group consisting of alkyl radicals containing from 6 to 20 carbon atoms, aryl radicals containing from 6 to 20 carbon atoms, and aralkyl radicals containing from 7 to 20 carbon atoms;

the said (c), when it is an epoxide, being selected from the group consisting of
   (i) epoxidized soybean oil,
   (ii) epoxidized esters of fatty acids having 10 to 30 carbon atoms in the chain with alkanols having up to 10 carbon atoms,
   (iii) epoxidized straight chain alpha-olefins,
   (iv) epoxidized polybutadiene, and
   (v) diglycidyl ether of 4,4'-isopropylidenediphenol; and the said (c), when it is a phosphite ester, having the formula

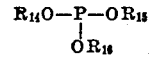

wherein $R_{14}$, $R_{15}$ and $R_{16}$ are hydrocarbon radicals having 1 to 30 carbon atoms selected from the group consisting of alkyl, aryl, cycloalkyl, alkaryl and aralkyl.

2. A composition as in claim 1 in which (b) and (c) are each present in amount of from 0.25 to 1.25 parts per hundred of elastomer, by weight.

3. A composition as in claim 2 in which the concentration of (a), per 100 parts by weight of elastomer, is:
   (a') from 0.25 to 1 part when (a) is not in itself an antioxidant for the elastomer;
   (a'') from 0.025 to 0.5 part when (a) is a hindered phenolic antioxidant for the elastomer; and (a''') from 0.025 to 0.8 part when (a) is an unhindered bisphenolic antioxidant for the elastomer.

4. A composition as in claim 3 in which (a) is as stated in (a').

5. A composition as in claim 3 in which (a) is as stated in (a'').

6. A composition as in claim 3 in which (a) is as stated in (a''').

7. A composition as in claim 3 in which (a) is 4,4'-isopropylidene bisphenol.

8. A composition as in claim 3 in which (a) is 4,4'-cyclohexylidene bisphenol.

9. A composition as in claim 3 in which (a) is p-chlorophenol.

10. A composition as in claim 3 in which (a) is styrenated phenol.

11. A composition as in claim 3 in which (a) is 2-methyl - 4 - (dimethylaminodithiocarbamoylmethyl)-6-tertiary-butylphenol.

12. A composition as in claim 3 in which (a) is 2-allylphenol.

13. A composition as in claim 3 in which (a) is p-phenylphenol.

14. A composition as in claim 3 in which (a) is phenol.

15. A composition as in claim 3 in which (a) is hydroquinone.

16. A composition as in claim 3 in which (b) is a sulfide.

17. A composition as in claim 16 in which (b) is bis-(2-benzothiazyl) disulfide.

18. A composition as in claim 16 in which (b) is ethylene bis(phenyl sulfide).

19. A composition as in claim 16 in which (b) is benzyl disulfide.

20. A composition as in claim 16 in which (b) is dodecyl sulfide.

21. A composition as in claim 16 in which (b) is n-octyl disulfide.

22. A composition as in claim 3 in which (b) is a thioester.

23. A composition as in claim 22 in which (b) is dilaurylthiodipropionate.

24. A composition as in claim 3 in which (c) is an epoxide.

25. A composition as in claim 24 in which (c) is epoxidized soybean oil.

26. A composition as in claim 24 in which (c) is an epoxidized straight chain alpha-olefin.

27. A composition as in claim 3 in which (c) is a phosphite ester.

28. A composition as in claim 27 in which (c) is tris(nonylphenyl) phosphite.

29. A composition as in claim 3 in which (a) is hydroquinone, (b) is benzyl disulfide and (c) is an epoxidized straight chain alpha-olefin.

30. A composition as in claim 3 in which (a) is hydroquinone, (b) is dodecyl sulfide and (c) is an epoxidized straight chain alpha-olefin.

31. A composition as in claim 3 in which (a) is hydroquinone, (b) is ethylene bis(phenyl sulfide) and (c) is an epoxidized straight chain alpha-olefin.

32. A composition as in claim 3 in which (a) is p-phenyl phenol, (b) is ethylene bis(phenyl sulfide) and (c) is an epoxidized straight chain alpha-olefin.

33. A composition as in claim 3 in which (a) is styrenated phenol, (b) is dilaurylthiodipropionate and (c) is epoxidized soybean oil.

34. A composition as in claim 3 in which (a) is 4,4'-isopropylidene bisphenol, (b) is dilaurylthiodipropionate and (c) is an epoxidized soybean oil.

35. A composition as in claim 3 in which the nonconjugated diene is dicyclopentadiene.

36. A composition as in claim 3 in which the nonconjugated diene is ethylidene norbornene.

References Cited

UNITED STATES PATENTS

| | | | |
|---|---|---|---|
| 3,255,136 | 6/1966 | Hecker et al. | 260—23 |
| 3,435,097 | 3/1969 | Bottomley et al. | 260—887 |
| 3,510,441 | 5/1970 | Huntzinger | 260—23 |
| 3,080,338 | 3/1963 | Nudenberg et al. | 260—45.7 |
| 3,357,946 | 12/1967 | Burgess | 260—45.85 |
| 2,569,502 | 10/1951 | Swern et al. | 260—348 |
| 2,731,443 | 1/1956 | Forman | 260—45.95 |
| 2,967,847 | 1/1961 | Hawkins et al. | 260—45.7 X |
| 3,069,384 | 12/1962 | Coffield | 260—45.95 |
| 3,190,852 | 6/1965 | Doyle | 260—45.85 |
| 3,227,676 | 1/1966 | Mills et al. | 260—45.85 |
| 3,250,712 | 5/1966 | Coffield | 260—45.95 X |
| 3,255,151 | 6/1966 | Hecker et al. | 260—45.9 |
| 3,408,320 | 10/1968 | Brucksch | 260—23.5 |
| 3,457,218 | 7/1969 | Haas et al. | 260—45.8 |
| 3,489,721 | 1/1970 | Kahle et al. | 260—80.78 |
| 3,534,007 | 10/1970 | Hoffman et al. | 260—80.78 |
| 3,361,691 | 1/1968 | Mazzeo | 260—23.5 |

DONALD E. CZAJA, Primary Examiner

D. B. BARRACK, Assistant Examiner

U.S. Cl. X.R.

260—45.7 P, 45.7 S, 45.8 A, 45.85, 45.9 R, 45.95, 80.78